(12) United States Patent  
Wu (10) Patent No.: US 7,584,477 B2  
(45) Date of Patent: Sep. 1, 2009

(54) CROSS REPOSITORY COPIER

(75) Inventor: Qiming (James) Wu, Fairport, NY (US)

(73) Assignee: Xerox Corporation, Norwalk, CT (US)

( * ) Notice: Subject to any disclaimer, the term of this patent is extended or adjusted under 35 U.S.C. 154(b) by 643 days.

(21) Appl. No.: 10/977,095

(22) Filed: Oct. 29, 2004

(65) Prior Publication Data

US 2006/0015879 A1    Jan. 19, 2006

Related U.S. Application Data

(60) Provisional application No. 60/588,089, filed on Jul. 14, 2004.

(51) Int. Cl.  
*G06F 3/00* (2006.01)  
*G06F 7/00* (2006.01)

(52) U.S. Cl. .......................... 719/310; 707/1

(58) Field of Classification Search ................ 719/310; 358/1.1, 1.5; 707/1  
See application file for complete search history.

(56) References Cited

U.S. PATENT DOCUMENTS

| | | | | |
|---|---|---|---|---|
| 5,528,375 A * | 6/1996 | Wegeng et al. | ............... | 358/296 |
| 6,256,676 B1 * | 7/2001 | Taylor et al. | ................ | 709/246 |
| 6,331,896 B1 * | 12/2001 | Morita | ....................... | 358/1.18 |
| 6,718,329 B1 * | 4/2004 | Selvin et al. | ................... | 707/10 |
| 2002/0174180 A1 * | 11/2002 | Brown et al. | ................. | 709/203 |
| 2003/0046366 A1 * | 3/2003 | Pardikar et al. | ............. | 709/219 |

* cited by examiner

Primary Examiner—Lechi Truong  
(74) Attorney, Agent, or Firm—Fay Sharpe LLP (57) ABSTRACT

A system for providing a cross repository copier in an enterprise print system is provided. The copier includes a processor and a memory for operating a graphic user interface (GUI) in the enterprise print system. The GUI receives data from a user for copying or moving source documents, wherein the data comprises source repository information, run settings, target repository information and a schedule time. The system further includes a control module for controlling the cross repository copier. The repository manager is connected to the control module and the plurality of repository adapters are linked to the repository manager, wherein each repository adapter is connected to a corresponding native Application Program Interface (API) and document repository system. The document repository system comprises one of Documentum, Domino.Doc, Livelink, FileNet, DocuShare, DigiPath, Remote File System (FTP), Local File System, or Network Drive.

13 Claims, 11 Drawing Sheets

| CONNECT TO REPOSITORY | | |
|---|---|---|
| REPOSITORY NAME: MYFTP ▼ | ☐ SAVE AS DEFAULT | |
| LOGIN | ☐ SAVE PASSWORD | |
| HOST NAME: 13.136.188.32 ▼ | CLEAR CACHE | |
| USER NAME: BSMITH | | |
| PASSWORD: ********** | | OK |
| REPOSITORY TYPE: REMOTE FILE SYSTEM ▼ | | CANCEL |
| | | HELP |
| SELECT REPOSITORY BROKER: | | |
| 13.1.86.208 ▼ | | |

CONNECT TO REPOSITORY

REPOSITORY NAME: MYDIGIPATH ▼

☐ SAVE AS DEFAULT

LOGIN

SERVER: 13.136.191.252 ▼

USER NAME: BSMITH

PASSWORD: **********

REPOSITORY TYPE: DIGIPATH 3.0 DOC LIBRARY ▼

☐ SAVE PASSWORD

CLEAR CACHE

SELECT REPOSITORY BROKER:

13.1.87.213 ▼

[ OK ]
[ CANCEL ]
[ HELP ]

*FIG. 6*

CONNECT TO REPOSITORY

REPOSITORY NAME: MYDOCUSHARE ▼

☐ SAVE AS DEFAULT

LOGIN

HOST NAME: 13.136.188.32

COLLECTION: 00012234

USER NAME: BSMITH

PASSWORD: **********

☐ SAVE PASSWORD

[CLEAR CACHE]

REPOSITORY TYPE: DOCUSHARE ▼

SELECT REPOSITORY BROKER:
13.1.86.208 ▼

[OK] [CANCEL] [HELP]

FIG. 7

CONNECT TO REPOSITORY

REPOSITORY NAME: MYFILENET ▼

LOGIN

SYSTEM: FILENET1
SERVER: 13.136.188.32 ▼
USER NAME: BSMITH
PASSWORD: **********
REPOSITORY TYPE: FILENET ▼

☐ SAVE AS DEFAULT
☐ SAVE PASSWORD

[ CLEAR CACHE ]

SELECT REPOSITORY BROKER: 13.1.86.208 ▼

[ OK ]
[ CANCEL ]
[ HELP ]

*FIG. 8*

CONNECT TO REPOSITORY

REPOSITORY NAME: MYLIVELINK ▶

☐ SAVE AS DEFAULT
☐ SAVE PASSWORD

[ CLEAR CACHE ]

─ LOGIN ─

HOST NAME / IP: 13.136.188.32 ▶
PORT NAME: 1024
DATABASE NAME: XYZ
USER NAME: BSMITH
PASSWORD: ************
LIVELINK WORKSPACE: ENTERPRISE ▶
REPOSITORY TYPE: LIVELINK ▶

SELECT REPOSITORY BROKER:
13.1.86.208 ▶

[ OK ]
[ CANCEL ]
[ HELP ]

*FIG. 9*

CONNECT TO REPOSITORY

REPOSITORY NAME: MYDOMINODOC ▼ ☐ SAVE AS DEFAULT

LOGIN

| | | |
|---|---|---|
| SERVER: | 13.136.188.32 ▼ | ☐ SAVE PASSWORD |
| DIRECTORY: | 0012234 | |
| LIBRARY: | XYZ | CLEAR CACHE |
| PROTOCOL: | HTTP ▼ | |
| USERID(HTTP): | BSMITH | |
| PASSWORD: | ********** | |
| REPOSITORY TYPE: | DOMINODOC ▼ | |

SELECT REPOSITORY BROKER:
13.1.86.208 ▼

[ OK ] [ CANCEL ] [ HELP ]

CROSS REPOSITORY COPIER

This application claims priority from U.S. Provisional Application Ser. No. 60/588,089, filed on Jul. 14, 2004.

BACKGROUND

The present exemplary embodiment relates generally to document management systems. It finds particular application in conjunction with multiple content/document repositories within an enterprise and will be described with particular reference thereto. However, it is to be appreciated that the present exemplary embodiment is also amenable to other like applications.

In today's corporate IT environment, co-existing multiple contents/document repositories within an enterprise are very common. The content integration and consolidation across different content management systems has been a great challenge to corporate IT departments. Since there is no single document repository system that has the mechanism of sharing, moving, and copying contents including their meta data to another system, especially a different type of repository, the content integration and consolidation, which are very much needed in the corporate environment, are practically impossible.

Thus, there is a need for a software tool that provides a simple, easy and powerful way to process content integration and consolidation across different content management systems with a single click. Such a tool would facilitate document management in a wide variety of applications, such as scanning, imaging, and printing, which would work with different content management systems.

BRIEF DESCRIPTION

In one embodiment, there is provided a cross repository copier comprising a graphical user interface (GUI) for receiving data from a user, a control module, a repository manager, and a plurality of repository adapters, wherein each repository adapter is connected to a native Application Program Interface (API) Library of a particular repository system and wherein each API is connected to one of a plurality of document repository systems. The document repository system may be, for example, Documentum, Domino.Doc, LiveLink, FileNet, DocuShare, DigiPath, Remote File System (FTP), Local File System, or Network Drive.

In another embodiment, a cross repository copying method in an enterprise print system is provided. The method comprises receiving data from a user, wherein the data includes a source repository, a target repository, and a scheduled time for copying or moving source documents from the source repository and the target repository; processing the data via a cross repository copier; and transferring the source documents to the target repository.

In yet another embodiment, a cross repository copying apparatus for use with an enterprise print system is provided. The apparatus comprises means for receiving data from a user, wherein the data includes a source repository, a target repository, and a scheduled time for copying or moving source documents from the source repository and the target repository; means for processing the data via a cross repository copier; and means for transferring the source documents to the target repository.

DETAILED DESCRIPTION

Figure 1:
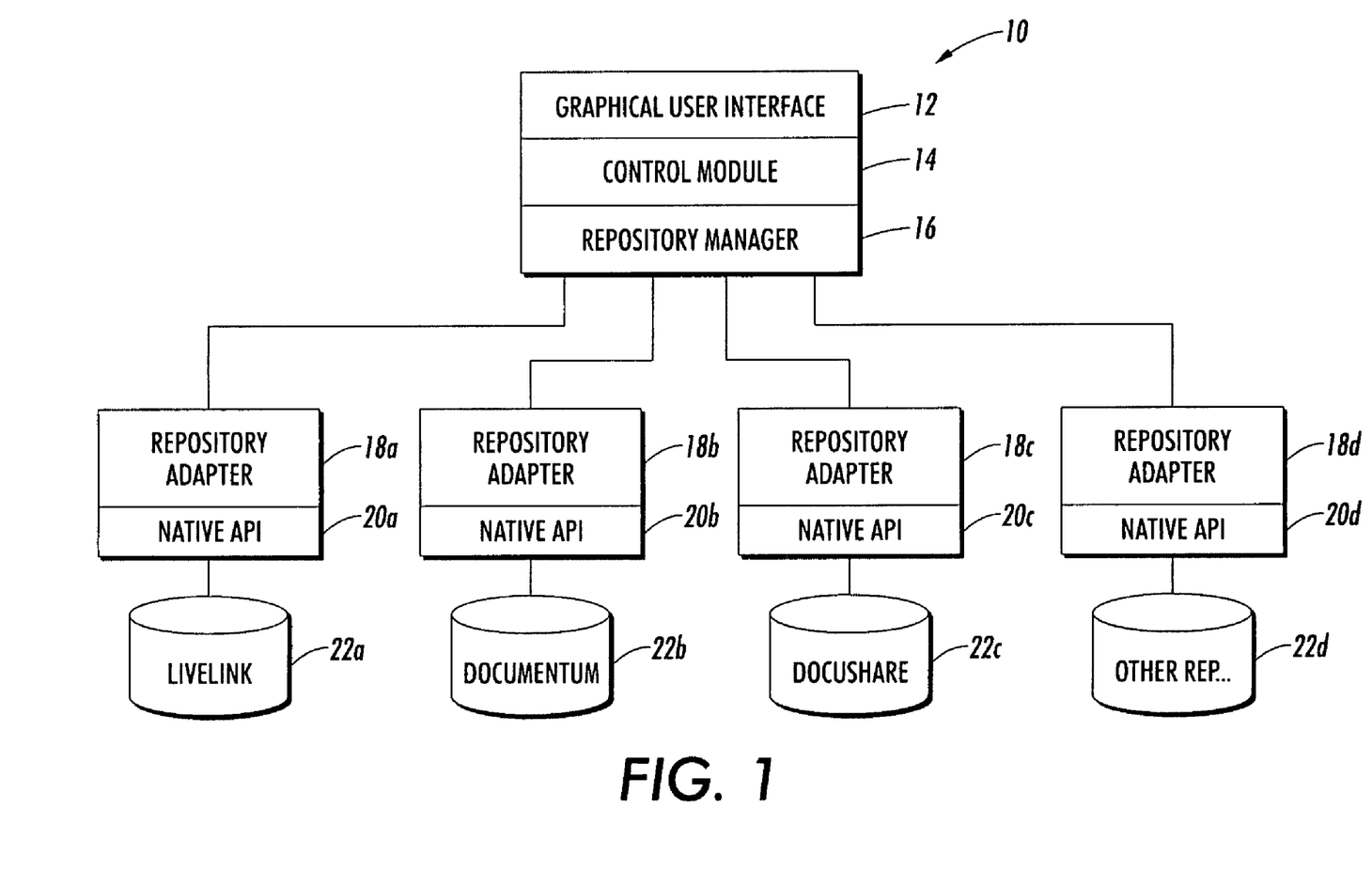
FIG. 1 is a block diagram of a cross repository copier.

Referring to FIG. 1, there is shown a block diagram of a cross repository copier 10, which is essentially a software application running in an operating system such as Microsoft Windows. It is to be appreciated, however, that the application may run in other operating systems. The cross repository copier 10 copies or moves the entire contents including all sub-folders from the specified source repository folder to the specified target repository folder. The source repository and the target repository can belong to different content management systems, e.g, copy from the local file system to Documentum, or move from Documentum to Livelink.

The copier 10 includes a graphical user interface (GUI) 12, a control module 14, and a repository manager 16. The repository manager 16 is linked to any number of repository adapters 18. In this embodiment, each repository adapter 18a-d is connected to a corresponding native API 20a-d, which, in turn, is connected to any number of document repository systems 22a-d, such as LiveLink, Documentum, DocuShare, or any other known document repository system.

The cross repository copier 10 supports non-content documents, compound documents and renditions. It can copy or move an entire compound document tree from one repository to another. A compound document is a document that contains one more documents including other compound documents with a particular order. The copier 10 also provide an option to copy or move all the renditions of the documents.

Besides the contents and renditions, the cross repository copier 10 also copies document properties (document meta data or document index). When the source repository and the target repository are different document management systems, which usually have different sets of document properties based on their particular Document Object Model, the copier 10 copies a small set of common properties (such as name, title, owner, etc.), plus a set of custom properties based on user defined property map. The copier 10 also provides users with a property-mapping GUI displaying two sets of properties side by side for source and target repositories.

The cross repository copier 10 supports at least the following nine different repository systems: Documentum, Domino.Doc, Livelink, FileNet, DocuShare, DigiPath, Remote File System (FTP), Local File System, and Network Drive. It is to be understood, however, that the copier 10 can support additional repositories by adding more repository adapters.

Figure 2:
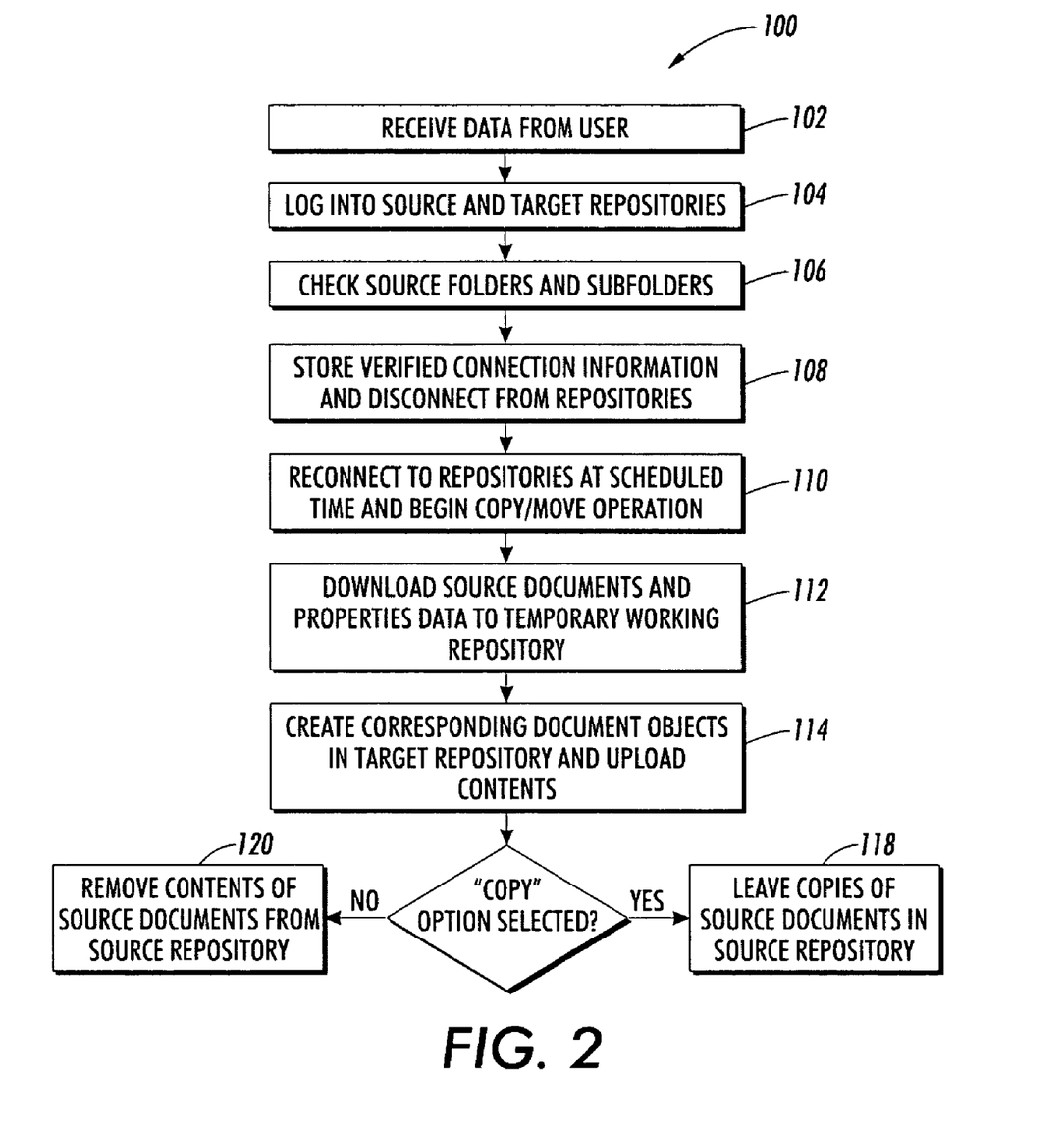
FIG. 2 is a flow diagram of a cross repository copying method.

Referring to FIG. 2, a cross repository copying method 100 utilizing the cross repository copier 10 is shown. In this embodiment, the method 100 is implemented in a printing software system such as XPrint from Xerox Corporation, Stamford, Connecticut. XPrint is an enterprise print system software that prints large and complex documents from Electronic Document Management Systems (EDMS) with high volumes at high speeds and accuracy. XPrint is also an enterprise document management system that provides a common interface to various EDMS, and a set of features for content management and content integration. It is to be appreciated, however, that the method 100 may be implemented in other suitable enterprise print systems.

The method 100 can be used to quickly and automatically move files from one location to another. These can be located in any of the repositories supported by the enterprise print system software. Initially, data is received from the user via the GUI 12 (102).

Figure 3:
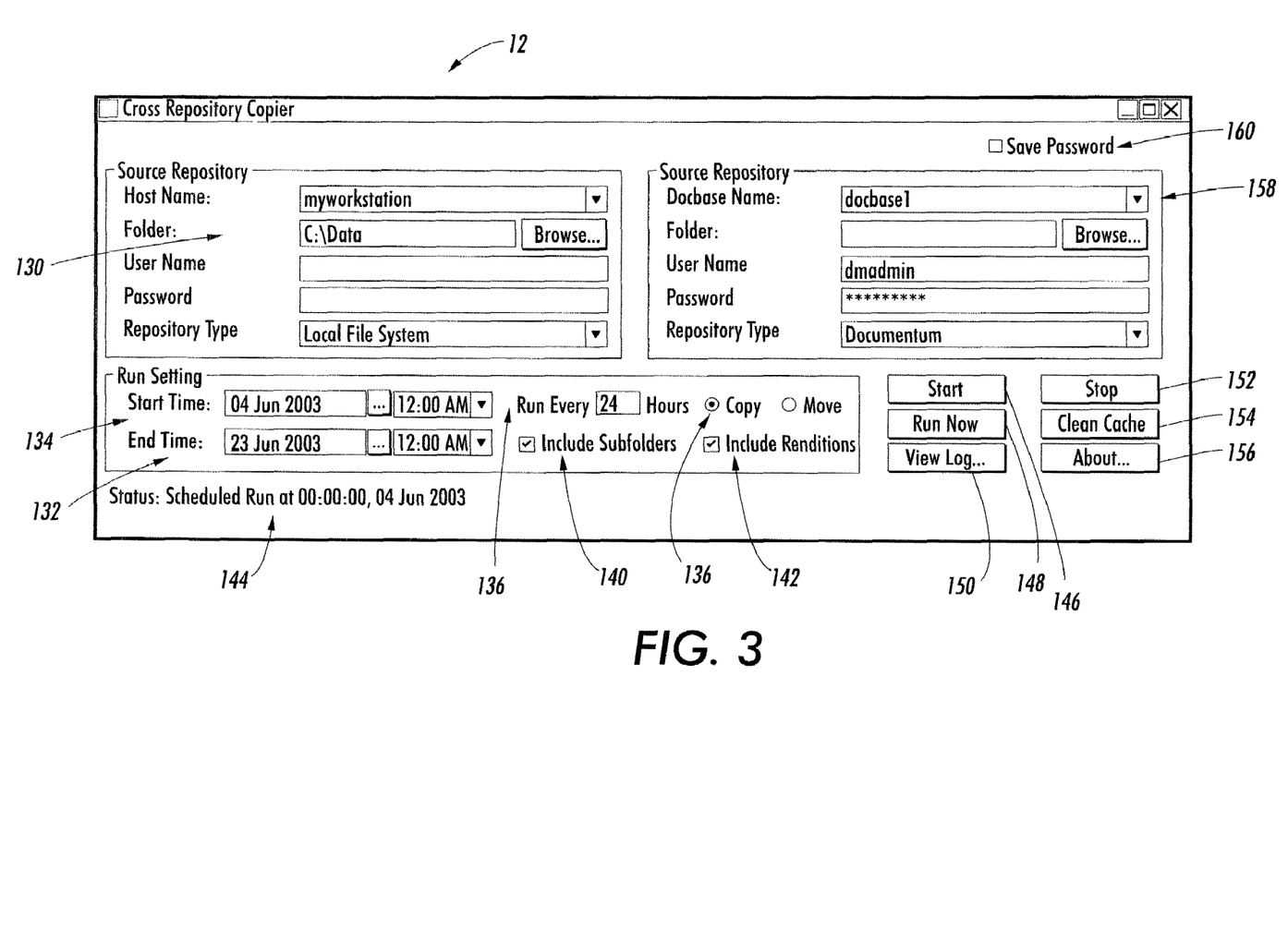
FIG. 3 is a screen shot of the graphical user interface for the cross repository copier.
Figure 4:
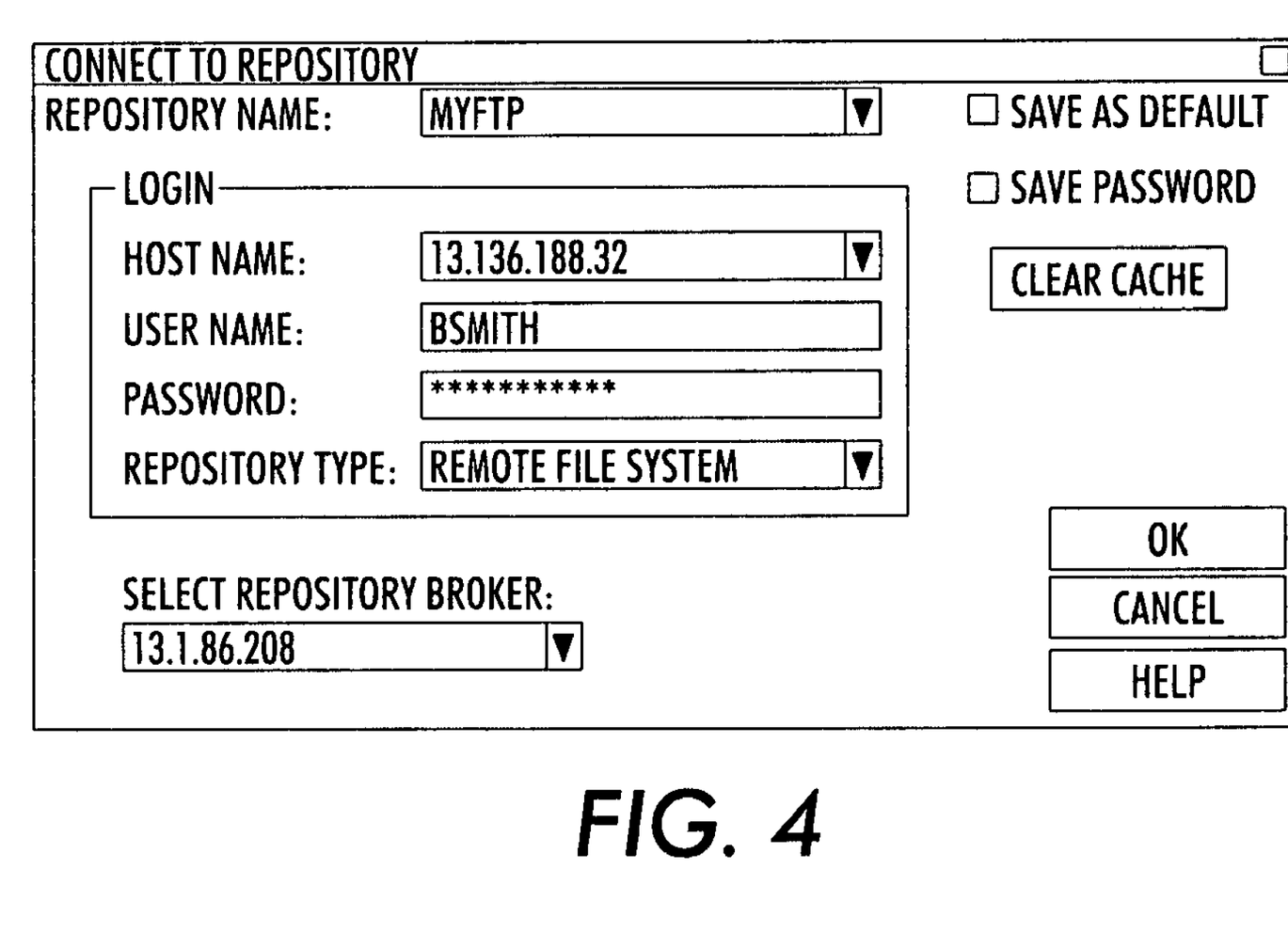
FIG. 4 is a screen shot illustrating specific repository connection information for Remote File System.

Reference is now made to FIG. 3, which represents a sample screen shot of the GUI 12 and the data that may be entered by the user. The Source Repository box 130 must be filled out with repository specific connection information relating to the source location. The pertinent information to be entered may include Host Name, Folder, User Name, Password, and/or Repository Type. The specific repository connection information differs slightly for each source or target repository system. By way of example, FIGS. 4-10 show specific repository connection information for various sample repositories, including Remote File System, Documentum, DigiPath, DocuShare, FileNet, Livelink, and Domino.Doc, respectively.

The Run Setting box 132 allows the user to schedule the copier 10. For example, the "Start Time/End Time" option 134 refers to an interval where the copy/move process should be active. If the "Run Hours" box 136 is filled, the running dialog will perform the requested operations at that interval. If "Copy" 138 is selected, the files will be copied to the target location, and will remain untouched in the source directory, otherwise a "move" operation will be performed and the source documents will be deleted after those document were uploaded to the target repository. The "Include Subfolders" option 140 specifies that the operation should be performed on all files and folders under the source directory. The "Include Renditions" option 142 specifies that the operation should be performed on all renditions under the source directory.

The "Status Field" 144 shows status messages relative to what the software has done or is doing. By clicking on the "Start" button 146, the program will begin waiting for the scheduled operation period. As soon as that time frame is reached, the requested operations will begin. The action of copying or moving can be invoked immediately by clicking the "Run Now" button 148 or can be scheduled to run automatically by specifying the Start Time, End Time and Run Interval.

By clicking on the "View Log" button 150, the program will display a log of copy/move operations. This is useful to determine if an operation was successful after the fact. The "Stop" button 152 stops the copier without performing further operations. The "Clean Cache" button 154 removes remembered the connection information the user entered. An "About" button 156 displays the program version, copyrights and other information.

The "Target Repository" portion 158 of the dialog must be filled out with repository specific connection information relating to the destination location. FIGS. 4-10 show Specific Repository Connection Information for these fields.

By checking the "Save Password" box 160, connection information specific to the currently used repositories will be stored in a database and will be pre-populated the next time the dialog is launched.

Once the information is entered by the user, the copier 10 logs into both the source repository and the target repository through its repository manager 16 and adaptors 18 (104). Next, the control module 14 checks the source folders and subfolders in the source repository as well as the target folder in the target repository (106). The copier 10 then stores the verified connection information and disconnects from both the source repository and target repository to wait for the scheduled operation time (108). Once it reaches the scheduled time, the copier 10 re-connects to the source and target repository and starts the copy/move operation (110). First, the copier's control module 14 downloads the source documents and their properties data to a temporary working repository that was set during the installation process and can be changed through the configuration option (112). Second, the control module 14 creates corresponding document objects in the target repository with the property data and uploads the contents and/or renditions (114). The control module 14 then determines whether the "copy" option has been selected (116). If so, then the source documents remain in the source repository (118), Otherwise, the control module 14 removes the source document objects from the source repository (120).

Figure 5:
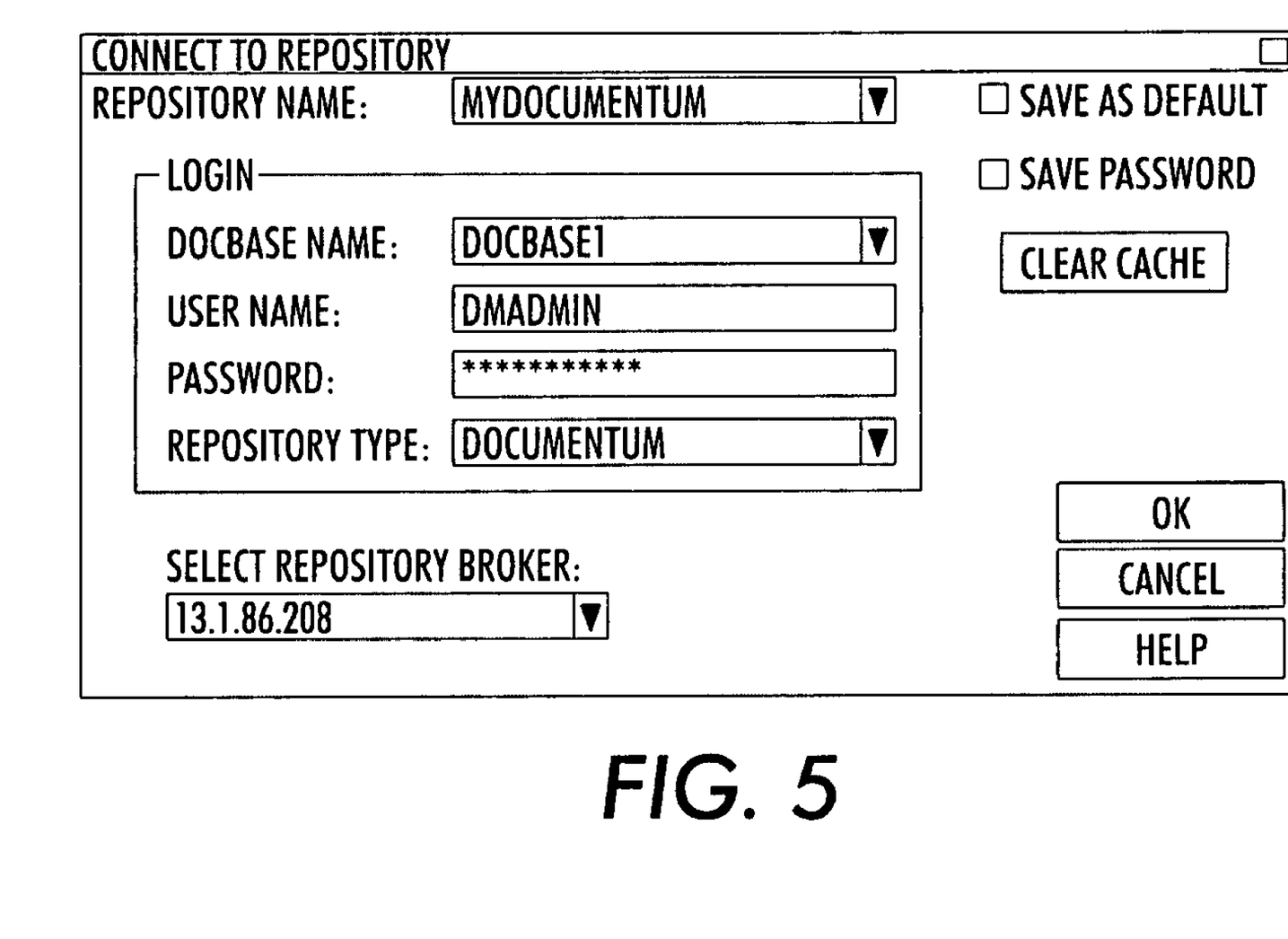
FIG. 5 is a screen shot illustrating specific repository connection information for Documentum.
Figure 6:
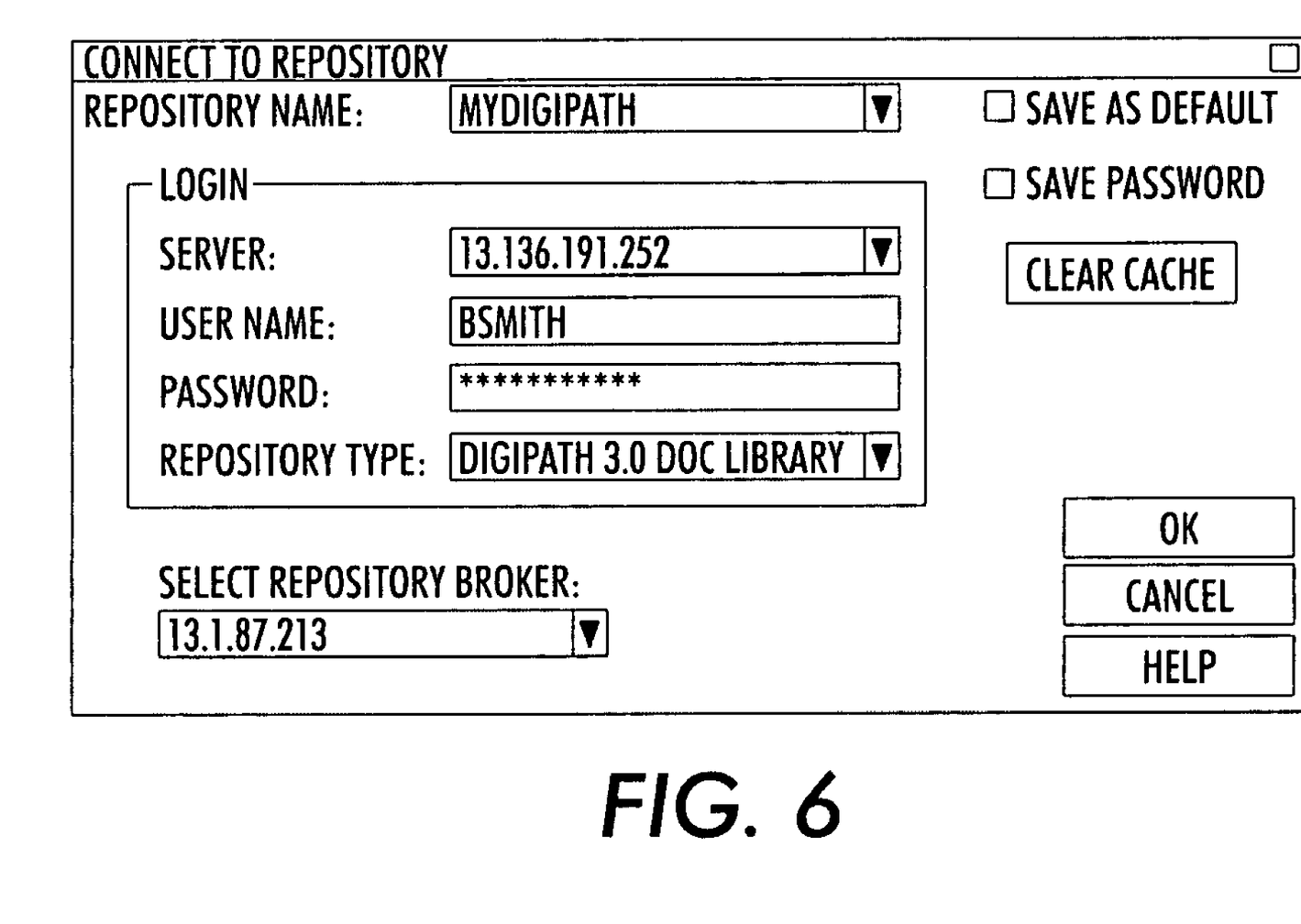
FIG. 6 is a screen shot illustrating specific repository connection information for DigiPath.
Figure 7:
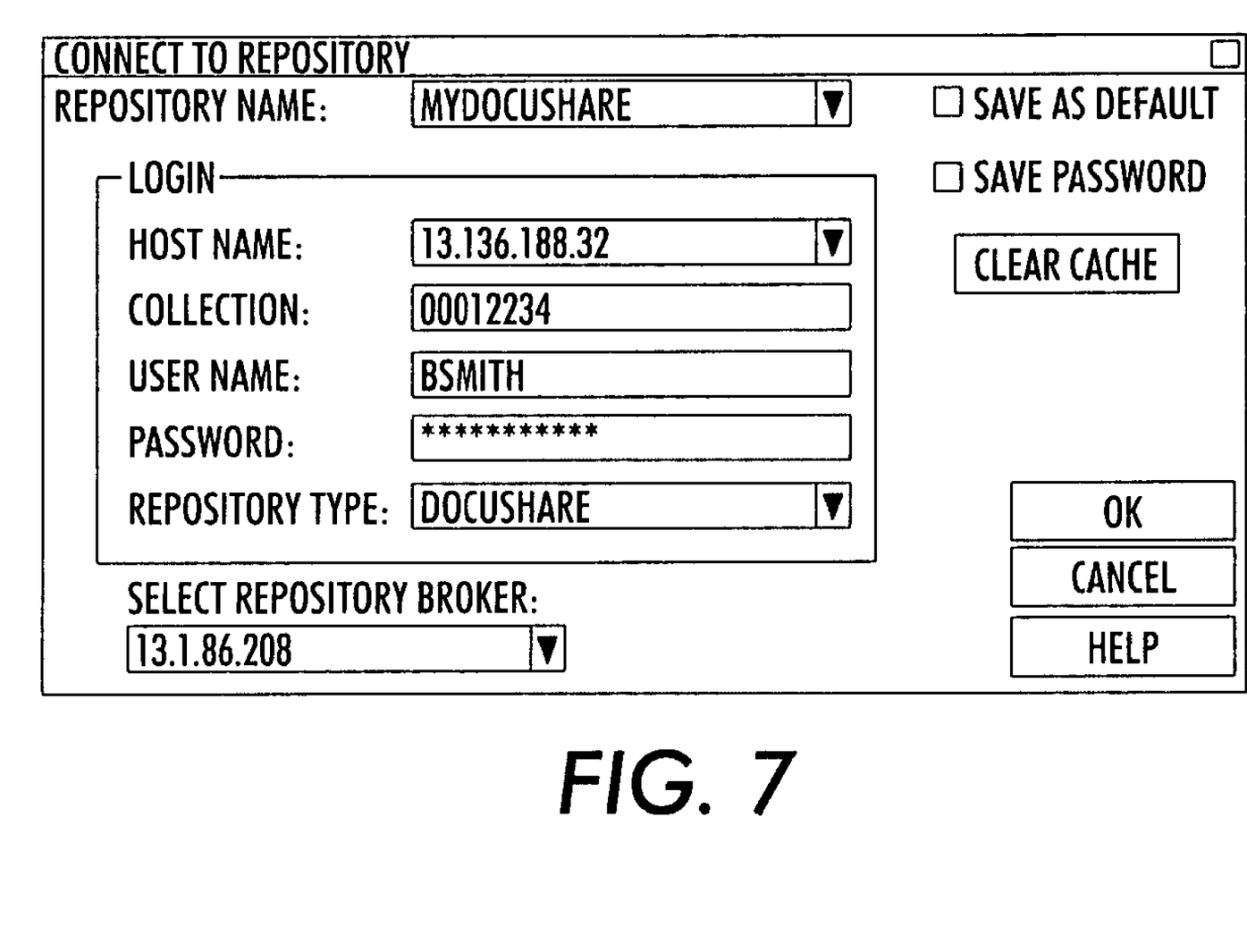
FIG. 7 is a screen shot illustrating specific repository connection information for DocuShare.
Figure 8:
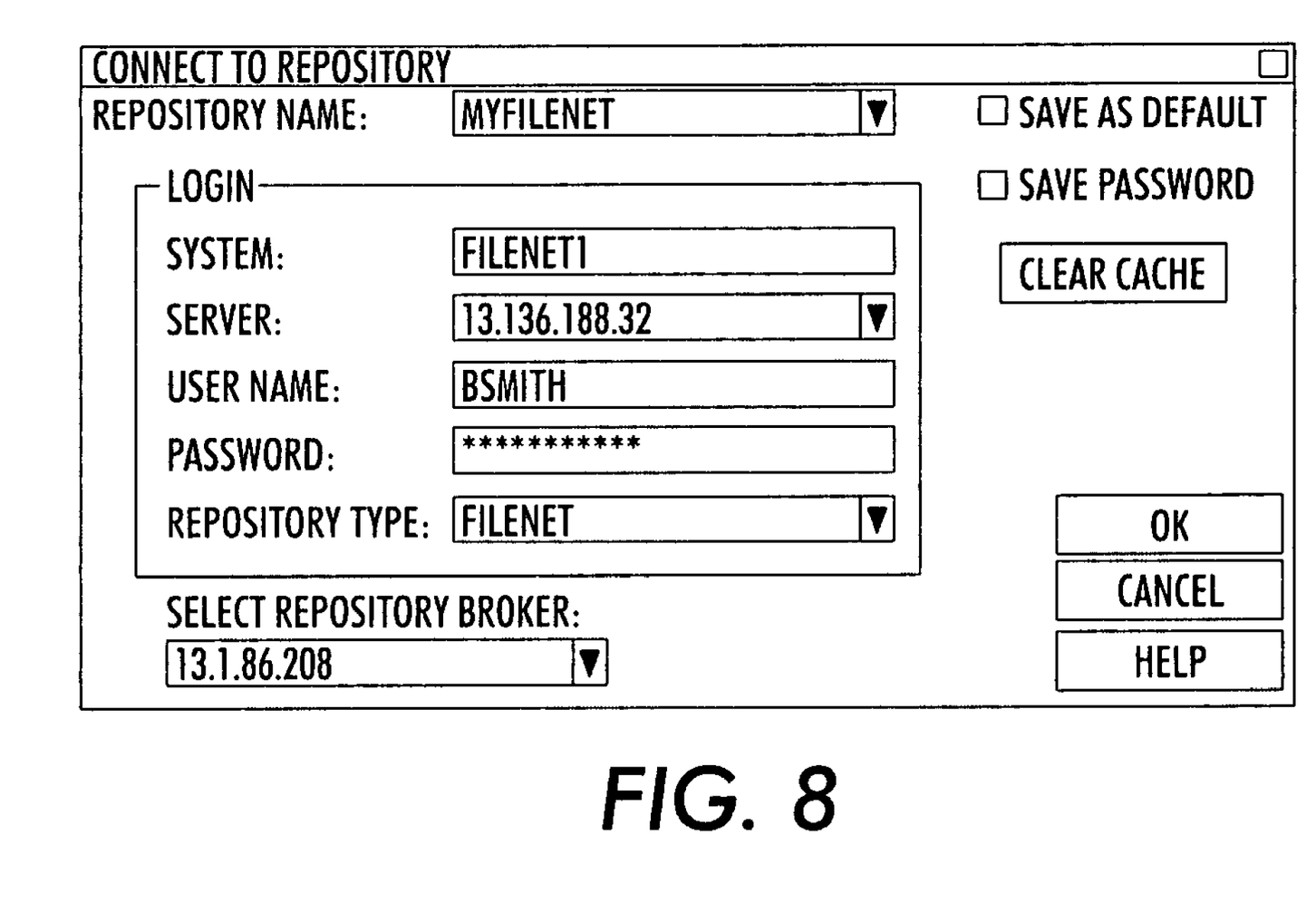
FIG. 8 is a screen shot illustrating specific repository connection information for FileNet.
Figure 9:
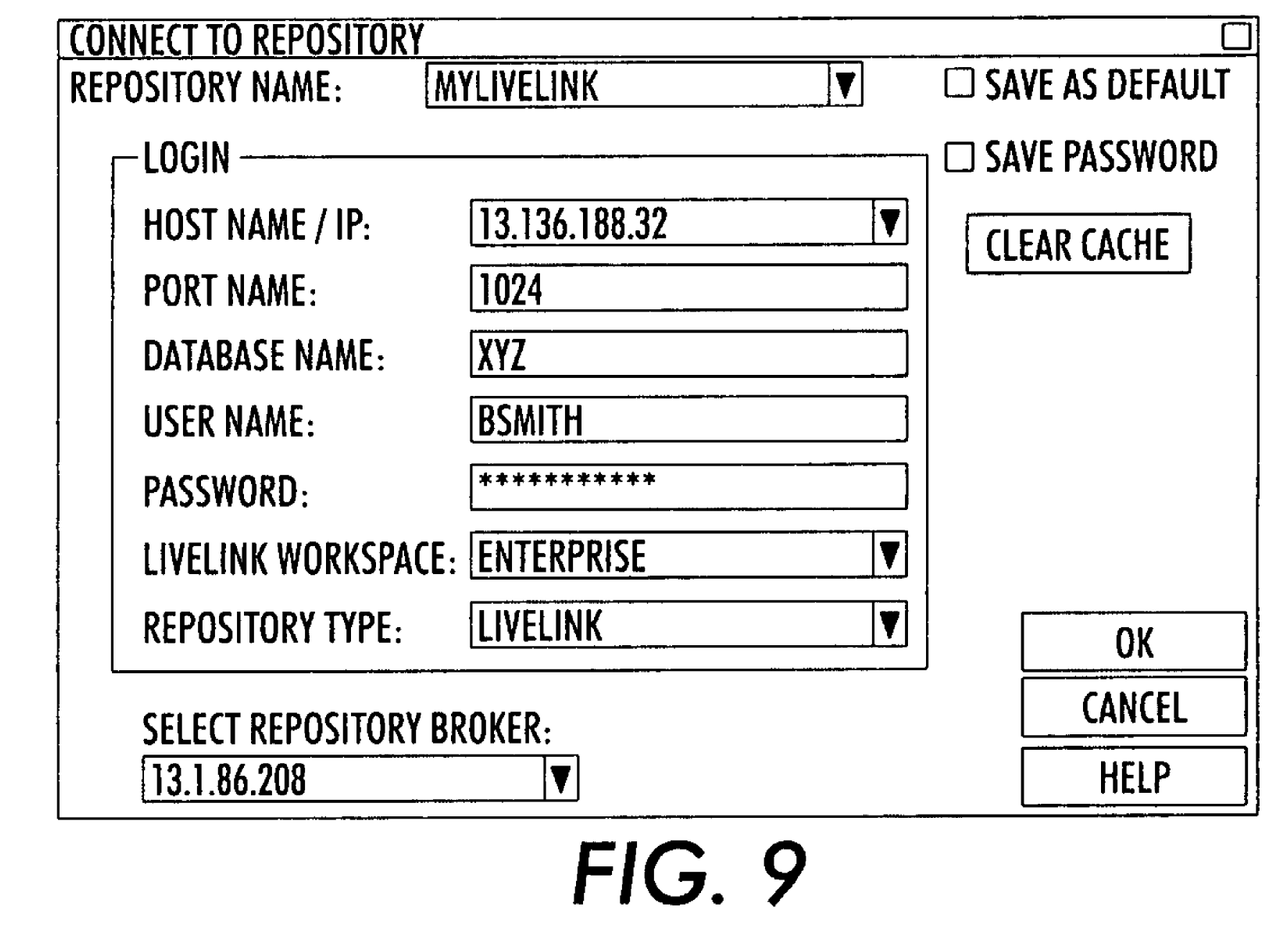
FIG. 9 is a screen shot illustrating specific repository connection information for Livelink.
Figure 10:
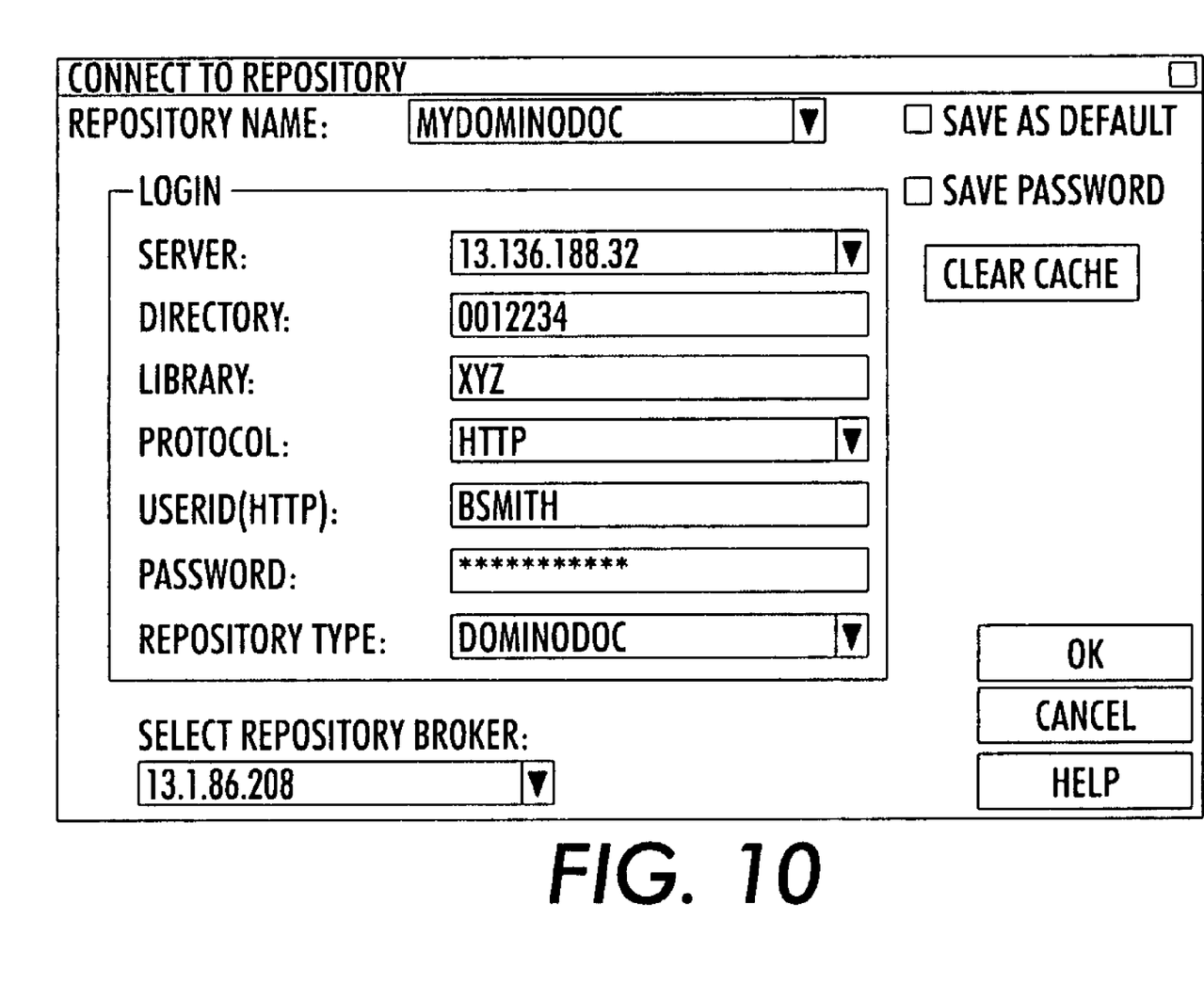
FIG. 10 is a screen shot illustrating specific repository connection information for Domino.Doc.
Figure 11:
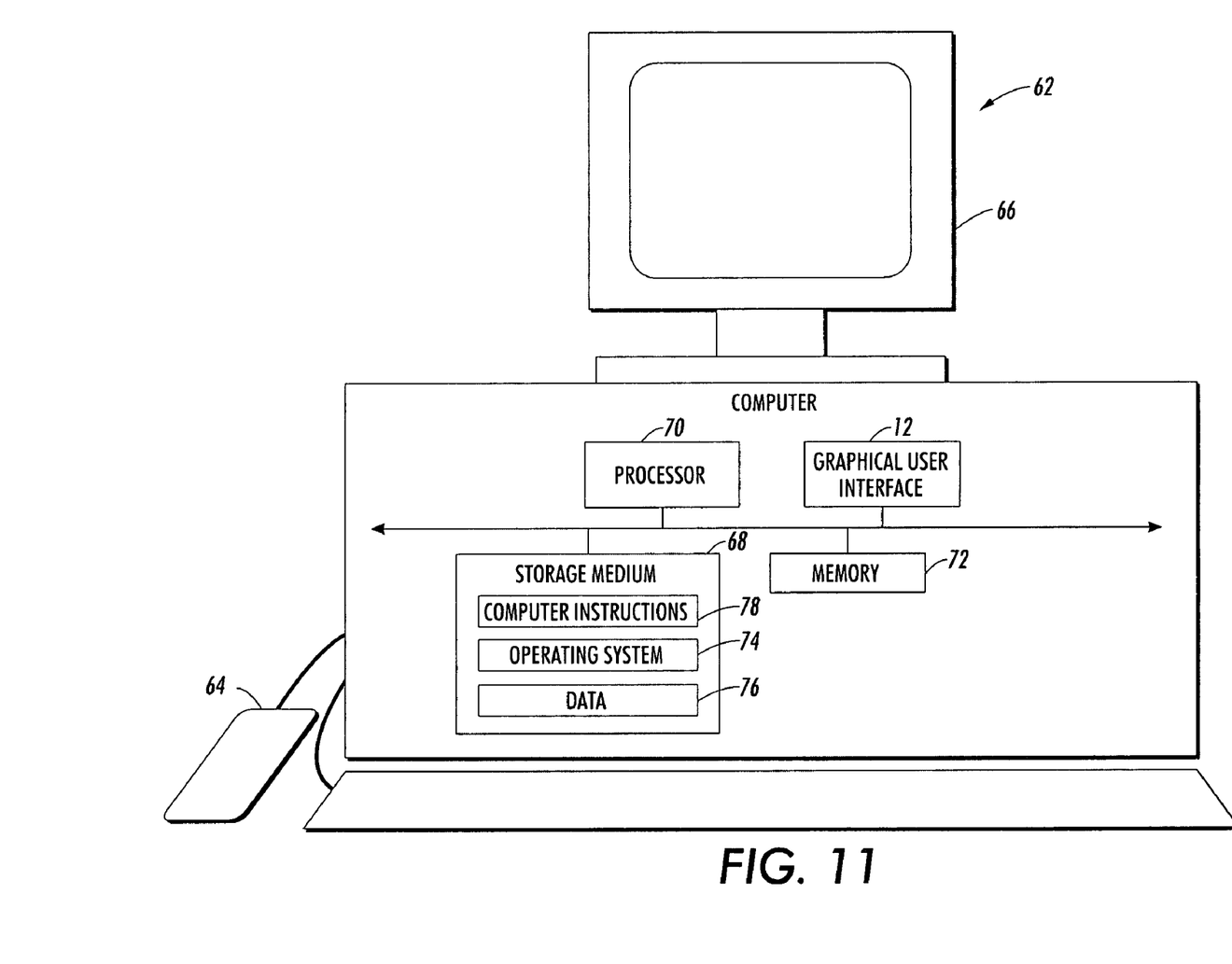
FIG. 11 is a block diagram of a computer system on which the method of FIG. 2 may be implemented.

FIG. 5 shows a computer 62 with a mouse 64, a monitor 66, and a graphical user interface 12 such as the source repository copier, for implementing the method 100. The computer 62 includes a storage medium 68 (e.g., hard disk), a processor 70, and a memory 72 for operating the graphical user interface 12. The storage medium 68 stores an operating system 74, data 76, and computer instructions 78 that are executed by the processor 70 out of the memory 72 to perform the method 100.

In this embodiment, the software program is written in C++ as a Windows application. It can also be written in Java or C# and can be implemented as a Web application. The method 100 is not limited to use with the hardware and software of FIG. 5, and it may find applicability in any computing or processing environment and with any type of machine that is capable of running a computer program. The method 100 may be implemented in hardware, software, or a combination of the two. The method 100 may be implemented in computer programs executed on programmable computers/machines that each include a processor, a storage medium/article readable by the processor (including volatile and non-volatile memory and/or storage elements), at least one input device, and one or more output devices. Program code may be applied to data entered using an input device to perform the method 100 and to generate output information.

Each computer program may be stored on a storage medium (article) or device (e.g., CD-ROM, hard disk, or magnetic diskette) that is readable by a general or special purpose programmable computer for configuring and operating the computer when the storage medium or device is read by the computer to perform the process. The process may also be implemented as a machine-readable storage medium, configured with a computer program, where upon execution, instructions in the computer program cause the computer to operate in accordance with the method 100.

In summary, the exemplary embodiment is a cross repository management tool, which allows users to integrate digital content across content management systems provided by different vendors. Content integration has been a great challenge in corporate environments that use content management systems from multiple vendors, e.g., there is no simple means of copying DocuShare content to a Livelink system. Thus, the exemplary embodiment includes single click or schedule execution of "copy" and "move" functions on large volume of document objects from a source repository to a target repository, where the source and target can be from different vendors. It also includes support for copying document metadata, support for copying compound documents, support for copying renditions across systems, and the ability to perform operation on entire folder hierarchy. By simplifying transfer of content among repositories from different vendors, the exemplary embodiment benefits repository managers, reducing the time and complexity of integrating content.

The exemplary embodiment has been described with reference to the preferred embodiments. Obviously, modifications and alterations will occur to others upon reading and understanding the preceding detailed description. It is intended that the exemplary embodiment be construed as including all such modifications and alterations insofar as they come within the scope of the appended claims or the equivalents thereof.

The invention claimed is:

1. A system for providing a cross repository copier in an enterprise print system, the cross repository copier comprising:
　a processor and a memory for operating a graphic user interface (GUI) in the enterprise print system;
　the graphical user interface (GUI) for receiving data from a user, wherein the data comprises source repository information, run setting, target repository information and a scheduled time for copying or moving source documents;
　a control module for controlling the cross repository copier for processing the data by:
　　logging into both a source repository of a first document repository system and a target repository of a second document repository system through a repository manager and a plurality of repository adaptors;
　　checking a plurality of source folders, subfolders in the source repository and target folders, subfolders in the target repository according to the data for a connection verification, wherein the source repository and the target repository belong to different content management systems;
　　downloading at least one source document from the source repository and its corresponding properties data to a working repository based on the connection verification and the scheduled time;
　　creating corresponding document objects in the target repository with the properties data;
　　moving the source document from the source repository to the target repository after creating the corresponding document objects;
　the repository manager is connected to the control module; and
　the plurality of repository adapters are linked to the repository manager, wherein each repository adapter is connected to a corresponding native Application Program Interface (API) and the first or the second document repository system, wherein the first or the second document repository system comprises one of Documentum, Domino.Doc, LiveLink, FileNet, DocuShare, DigiPath, Remote File System( FTP), Local File System or Network Drive.

2. The system for providing a cross repository copier defined in claim 1, wherein the enterprise print system comprises XPrint.

3. A cross repository copying method in an enterprise print system, a computer implemented the cross repository copying method comprising:
　receiving data on the computer from a user via a Graphic user interface (GUI) in the enterprise print system, wherein the data includes source repository information, target repository information, and a scheduled time for copying or moving source documents from a source repository and a target repository, wherein the source repository and the target repository belong to different content management systems;
　controlling a cross repository copier for processing the data by a control module, wherein controlling comprising:
　　logging into both the source repository of a first document repository system and the target repository of a second document repository system through a repository manager and a plurality of repository adaptors;
　　checking a plurality of source folders, subfolders in the source repository and target folders and subfolders in the target repository according to the data for a connection verification, wherein the source repository and the target repository belong to different content management systems;
　　downloading at least one source document from the source repository and its corresponding properties data to a working repository based on the connection verification and the scheduled time;
　　creating corresponding document objects in the target repository with the properties data;
　　moving the source document from the source repository to the target repository after creating the corresponding document objects;
　wherein the repository manager is connected to the control module, and wherein the plurality of repository adapters are linked to the repository manager, wherein each repository adapter is connected to a corresponding native Application Program Interface (API) and the first or the second document repository system, wherein the first or the second document repository system comprises one of Documentum, Domino.Doc, LiveLink, FileNet, DocuShare, DigiPath, Remote File System (FTP), Local File System or Network Drive.

4. The cross repository copying method defined in claim 3, wherein processing the data comprises:
　logging into the source repository and the target repository;
　checking source folders and subfolders;
　storing verified connection information;
　disconnecting from the source and target repositories;
　reconnecting to the source and target repositories at the scheduled time;
　staffing the copy or move operation; and
　downloading the source documents to a temporary working repository.

5. The cross repository copying method defined in claim 4 further comprising removing the source document from the source repository where the user has not selected a copy option via the GUI.

6. The cross repository copying method defined in claim 3 further comprising removing the source document from the source repository where the user has not selected a copy option via the GUI.

7. The cross repository copying method defined in claim 3 wherein the enterprise print system comprises XPrint.

8. The cross repository copying method defined in claim 7 further comprising removing the source document from the source repository where the user has not selected a copy option via the GUI.

9. An article of manufacture comprising:
- a computer storage medium having computer readable program code embodied thereon for controlling a computer to perform a method comprising:
  - receive data on the computer from a user via a graphic user interface (GUI) in an enterprise print system, wherein the data includes source repository information, target repository information, and a scheduled time for copying or moving source documents from a source repository and a target repository, wherein the source repository and the target repository belong to different content management systems;
  - controlling a cross repository copier for processing the data by a control module;
- wherein controlling comprising:
  - logging into both the source repository of a first document repository system and the target repository of a second document repository system through a repository manager and a plurality of repository adaptors;
  - checking a plurality of source folders, subfolders in the source repository and target folders, subfolders in the target repository according to the data for a connection verification;
  - downloading at least one source document from the resource repository and its corresponding properties data to a working repository based on the connection verification and the scheduled time;
  - creating corresponding document objects in the target repository with the properties data; and
  - moving the source document from the source repository to the target repository after creating the corresponding document objects, wherein the repository manager is connected to the control module, and wherein the plurality of repository adapters are linked to the repository manager, wherein each repository adapter is connected to a corresponding native Application Program Interface (API) and the first or the second document repository system, wherein the first or the second document repository system comprises one of Documentum, Domino.Doc, LiveLink, FileNet, DocuShare, DigiPath, Remote File System( FTP), Local File System or Network Drive.

10. The article of manufacture defined in claim 9, wherein the computer storage medium has computer readable program code embodied thereon for controlling the computer to:
- log into the source repository and the target repository;
- check source folders and subfolders;
- store verified connection information;
- disconnect from the source and target repositories;
- reconnect to the source and target repositories at the scheduled time;
- start the copy or move operation; and
- download the source documents to a temporary working repository.

11. The article of manufacture defined in claim 10 wherein the computer storage medium has computer readable program code embodied thereon for controlling the computer to:
- remove the source document from the source repository where the user has not selected a copy option via the GUI.

12. The article of manufacture defined in claim 9, wherein the computer storage medium has computer readable program code embodied thereon for controlling the computer to:
- remove the source document from the source repository where the user has not selected a copy option via the GUI.

13. The article of manufacture defined in claim 9, wherein the enterprise print system comprises XPrint.

* * * * *